United States Patent
Schroeder et al.

(10) Patent No.: US 6,995,761 B1
(45) Date of Patent: Feb. 7, 2006

(54) COMPRESSION OF 3D SURFACES USING PROGRESSIVE GEOMETRY

(75) Inventors: Peter Schroeder, Altadena, CA (US); Wim Sweldens, New Providence, NJ (US); Andrei Khodakovsky, Santa Clara, CA (US)

(73) Assignees: California Institute of Technology, Pasadena, CA (US); Lucent Technologies, Inc., Murray Hill, NJ (US)

( * ) Notice: Subject to any disclaimer, the term of this patent is extended or adjusted under 35 U.S.C. 154(b) by 1108 days.

(21) Appl. No.: 09/658,214

(22) Filed: Sep. 8, 2000

Related U.S. Application Data

(60) Provisional application No. 60/176,155, filed on Jan. 14, 2000.

(51) Int. Cl.
*G06T 15/00* (2006.01)

(52) U.S. Cl. .................................... 345/419; 345/423

(58) Field of Classification Search ................ 345/420; 382/232, 240, 248
See application file for complete search history.

(56) References Cited

U.S. PATENT DOCUMENTS

| | | | |
|---|---|---|---|
| 5,905,507 A | | 5/1999 | Rossignac et al. |
| 6,088,034 A | | 7/2000 | Deering |
| 6,144,773 A | | 11/2000 | Kolarov et al. |
| 6,201,881 B1 * | | 3/2001 | Masuda et al. ............. 382/100 |
| 6,271,856 B1 * | | 8/2001 | Krishnamurthy ............ 345/581 |
| 6,285,372 B1 * | | 9/2001 | Cowsar et al. .............. 345/420 |
| 6,366,279 B1 * | | 4/2002 | Gorman ...................... 345/419 |
| 6,516,093 B1 * | | 2/2003 | Pardas et al. ............... 382/243 |
| 6,525,722 B1 * | | 2/2003 | Deering ...................... 345/419 |
| 6,597,363 B1 * | | 7/2003 | Duluk et al. ................ 345/506 |
| 6,738,062 B1 * | | 5/2004 | Moreton ..................... 345/423 |
| 6,795,070 B1 * | | 9/2004 | Laurent-Chatenet et al. ..... 345/423 |
| 6,879,324 B1 * | | 4/2005 | Hoppe ........................ 345/423 |

OTHER PUBLICATIONS

Article "Multiresolution Signal Processing for Meshes" by Peter Schroder et al., International Conference on Computer Graphics Proceedings of the 26th annual conference on Computer graphics and interactive techniques pp.: 325-334 Year of Publication: 1999.*

Article "Semi-regular mesh extraction from volumes" by Peter Schroder et al., IEEE Visualization Proceedings of the conference on Visualization '00 Salt Lake City, Utah, United States, pp.: 275-282, Year of Publication: 2000 ISBN: 1-58113-309-X.*

* cited by examiner

*Primary Examiner*—Ulka J. Chauhan
*Assistant Examiner*—Enrique L. Santiago
(74) *Attorney, Agent, or Firm*—Fish & Richardson P.C.

(57) ABSTRACT

A new progressive compression scheme for arbitrary topology, highly detailed and densely sampled meshes arising from geometry scanning. Meshes may have three distinct components: geometry, parameter, and connectivity information. The latter two do not contribute to the reduction of error in a compression setting. Using semi-regular meshes, parameter and connectivity information can be virtually eliminated. The semiregular meshes may be used with semi-regular wavelet transforms, zerotree coding, and subdivision based reconstruction.

25 Claims, 5 Drawing Sheets

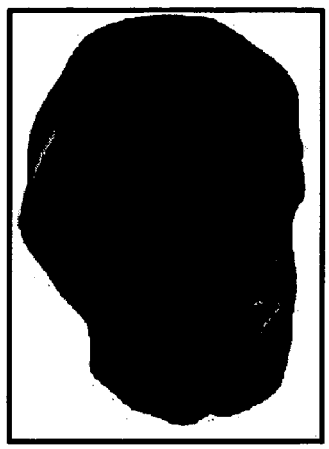 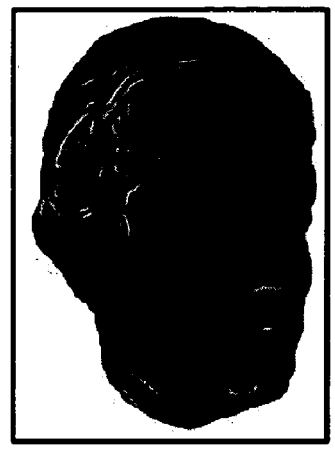
FIG. 1A          FIG. 1B
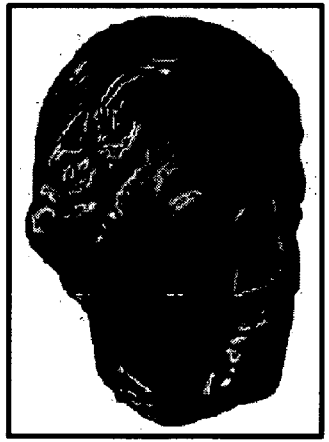 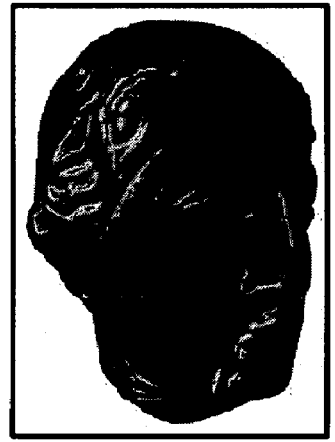
FIG. 1C          FIG. 1D
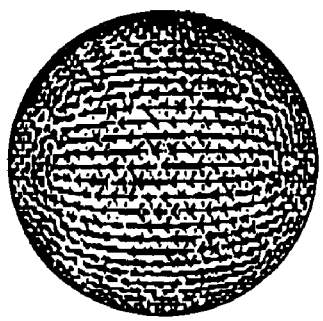 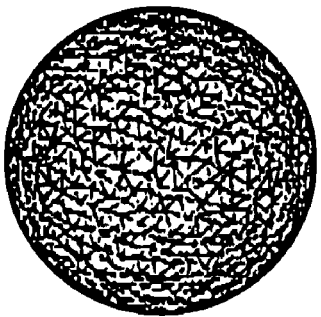 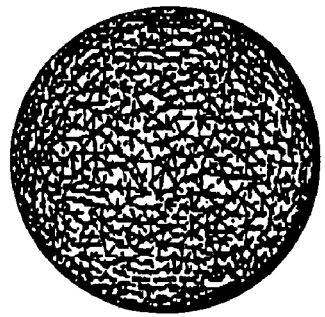
FIG. 2A     FIG. 2B     FIG. 2C

COMPRESSION OF 3D SURFACES USING PROGRESSIVE GEOMETRY

This application claims the benefit of U.S. Provisional Application Ser. No. 60/176,155, filed on Jan. 14, 2000.

The U.S. Government may have a paid-up license to certain aspects of this invention, along with the right in limited circumstances to require the patent owner to license others on reasonable terms as provided for by the terms of NSF grant numbers ACI-9624957, ACI-9721349, and DMS-9872890.

BACKGROUND

An arbitrary topology surface can be three dimensionally characterized by descriptions of vertices on the surface and their connectivity. The detail of the surface depends on the number of points that are described, and the amount of information describing each point.

The amount of information describing these models can be extensive. The information, however, can be compressed to reduce some of the load. Compression in general is a tradeoff between accuracy and bit rate, i.e., bits per vertex. This tradeoff is captured in rate-distortion curves.

Rate-distortion curves require the computation of errors or "distortion" between the original surface and a surface that has been estimated. For geometry, an error may be computed using techniques that measure the distance between the geometric shapes. The original and compressed meshes may have very different sample locations and connectivity. Progressive compression provides an early, coarse approximation of the geometry. This is subsequently improved through additional information.

SUMMARY

A new progressive geometry compression method is disclosed which is based on smooth semi-regular meshes. The Semi-regular meshes may be used with wavelet transforms and zerotree coders. Missing geometry information may be filled in with smooth subdivision patches. Hence even highly compressed surfaces can be smooth and visually pleasing.

BRIEF DESCRIPTION OF THE DRAWINGS

FIGS. 1A–1D show views of progressive compressions of a Venus head;

FIGS. 2A–2C shows triangulations of a sphere;

DETAILED DESCRIPTION

Figure 3:
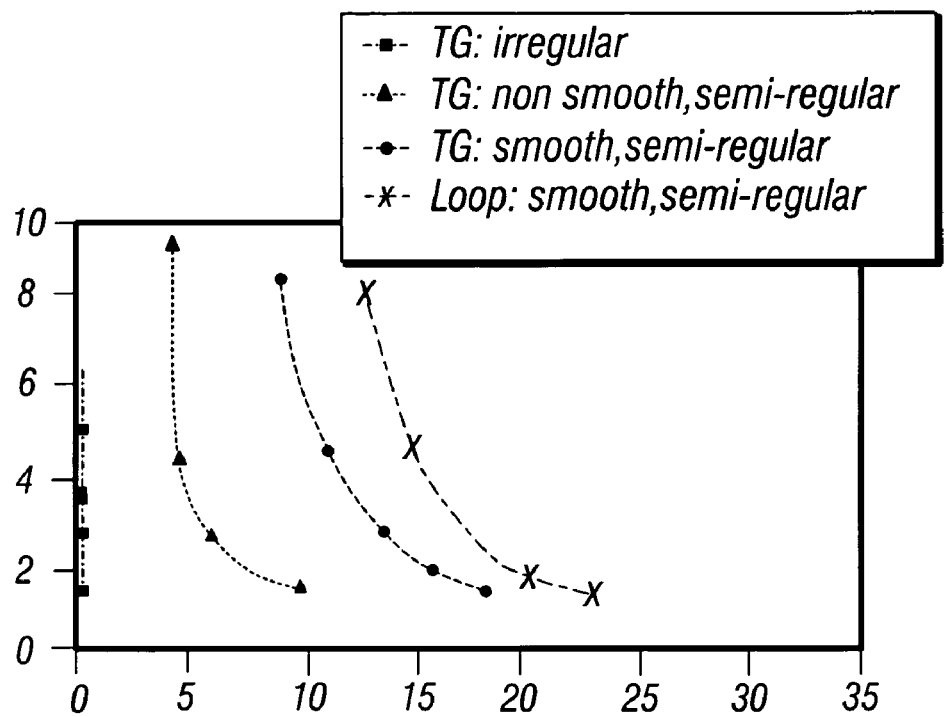
FIG. 3 shows rate distortion curves.

Any source geometry is continuous. Any digital representation, such as a triangle mesh, has some error E associated with it. This error E has three components—due to sampling, discretization, and quantization.

Sampling error Es arises from acquisition noise. Discretization error Ed is due to the fact that a triangulation with edge length h can approximate a smooth geometry no better than $O(h^2)$. A finite bit representation for the continuous vertex positions leads to the quantization error Eq. Sampling and triangulation of the model fix Es and Ed. A standard floating point representation inside the computer typically leads to a quantization error much smaller than Es+Ed. Single rate coders quantize the vertex positions more coarsely, leading to a quantization error Eq≈Es+Ed. They then losslessly encode the connectivity and quantized vertex positions. Existing progressive coders aim to eventually recover the quantized sample locations and original connectivity.

Since distortion is measured as geometric distance, the sample locations and connectivity can be treated as additional degrees of freedom to improve the rate-distortion performance. As long as the final result has a geometric error on the order of the original E, the actual sample locations and connectivity do not matter. The information contained in the sample locations is, parameter information. For example, by letting the vertices slide within the surface, only the parameter information is changed and not the geometric fidelity.

Meshes can be built by successive triangle quadrisection starting from a coarse irregular mesh. This is done to eliminate certain parameter and connectivity information. Almost all vertices in a semi-regular mesh have valence six. Their sample locations can be estimated well. Parameter and connectivity information make up a considerable fraction of the bit budget in existing coders, but do not contribute at all to reducing geometric error. Consequently, the rate-distortion curves of this method can be better than those of existing coders. For most models, the error of the present system is about four times smaller at comparable bit rates, a 12 dB improvement.

The present application builds on the observation that parameter information makes up a significant fraction of the bit budget while not contributing to error reduction at all.

The technique of the present application starts with a defined irregular mesh describing a 2-manifold, without or with boundary. It produces successive approximations employing semi-regular meshes, that is, meshes which are as regular as possible. Since the meshes are more regular, less parameter and connectivity information can be used.

The coder first produces a hierarchical approximation of the surface. This expression is subsequently encoded with a coder, e.g., a zerotree progressive coder. Advantages include the following. Parameter information can be reduced. A Loop based wavelet transform can be used for high order decorrelation and subdivision based reconstruction. A special zero tree hierarchy can be used for primal semi-regular triangle meshes of arbitrary topology.

Zero Tree Coders are wavelet based progressive coders based on zero trees. They are described, for example, in Said, A., and Pearlman, W. A New, Fast, and Efficient Image Codec Based on Set Partitioning in Hierarchical Trees. IEEE Transaction on Circuits and Systems for Video Technology 6, 3 (1996), 243–250; Shapiro, J. Embedded Image-Coding using Zerotrees of Wavelet Coefficients. IEEE Transactions on Signal Processing 41, 12 (1993), 3445–3462; Davis, G., and Chawla, S. Image Coding Using Optimized Significance Tree Quantization, in Proceedings Data Compression Conference, 387–396, 1997.

Zero tree coders effectively exploit the fact that wavelet coefficients at finer scales tend to be smaller in magnitude than coefficients at coarser scales in the same region. A zero tree coder encodes the location of coefficients below threshold in subtrees.

Previous compression approaches have typically treated triangle meshes as having two distinct components: connectivity and vertex positions. State of the art coders are able to encode connectivity of irregular meshes with 2 bits/vertex ("b/v") or even less. Hence, it is argued, vertex positions are much more expensive and their coding needs further advancement, for example through better predictors.

The present application handles three components: connectivity, geometry, and parameter information separately. The parameter information captures the sample locations within the surface. The geometry information captures the geometry independent of the sample locations used. In the prior art, parameter and geometry information have been treated together.

Consider a vertex of a particular Venus head triangulation in FIGS. 1A–1D. Moving this vertex slightly within the surface does not change the discretization error or the geometry information—It only affects the parameter information. Alternatively, moving the vertex in a direction normal to the surface changes the error and geometry information. However, it leaves parameter information unchanged. This illustrates that while geometry and parameter information are globally intertwined, they *disconnect locally. Parameter information is described by displacements in the tangent plane to the surface. Geometry information, on the other hand, is normal to the surface. This implies that from a rate distortion point of view, bits should be allocated preferentially to the local normal direction. For smooth parameterizations, this may occur naturally, since prediction residuals in the tangent plane will be small.

The distinction between geometry, parameter, and connectivity information can be seen from three triangulations of a sphere shown in FIGS. 2A–2C. All three meshes have the same geometry information and carry the same discretization error Ed with no sampling noise. The first two meshes have semi-regular connectivity but different parameter information. The middle sphere in FIG. 2B was generated by moving the sample locations within the sphere, thereby adding extra parameter information. The rightmost sphere in FIG. 2C has irregular connectivity and parameter information. FIG. 3 shows the respective resulting rate-distortion curves when using the state of the art non-progressive coder of Touma, C., and Gotsman, C. Triangle Mesh Compression. Graphics Interface '98 (1998), 26–34, herewith "the TG coder". The non-progressive curves are dashed since these points are not achievable in a progressive manner. In case of the smooth semi-regular mesh, the TG coder correctly noticed that it contains almost no connectivity information (0.1 b/v) and almost no parameter information. Its performance is essentially limited by the quality of the predictor used. The TG coder for the non-smooth semi-regular sphere is worse, thereby illustrating the bit penalty for parameter information. The TG coder for the irregular mesh (right) illustrates the additional overhead from irregular connectivity. This example demonstrates that reducing both connectivity and parameter information in a mesh can have advantages.

Finally, the small curve near the y-axis shows the result of applying our coder to the smooth semi-regular mesh. It can approximate the sphere with a relative error of $5 \times 10^{-5}$ using 166 bytes or approximately 0.5 b/v. This is because a sphere has very little geometric information and smooth semi-regular mesh is essentially optimal for the coder. This is where the high order decorrelation and subdivision based reconstruction really pays off. This same effect is used in smooth, regularly sampled regions of more general surfaces.

Figure 4:
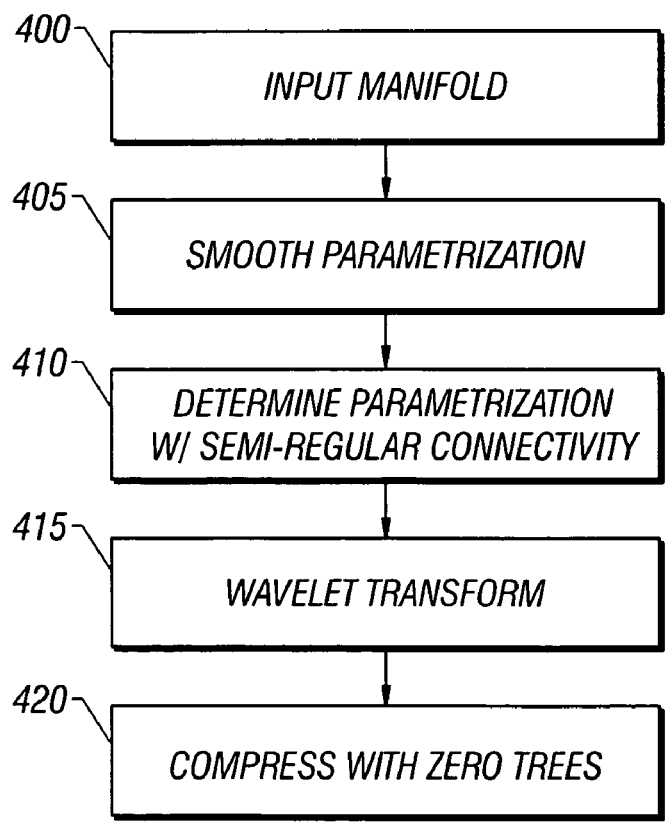
FIG. 4 shows a flowchart of an operation of compressing a 3D image.

Components of the surface compression technique are described with reference to the flowchart of FIG. 4A.

An arbitrary connectivity 2-manifold with boundary triangulation is taken as input at 400. A smooth global parameterization is calculated using the "MAPS" technique at 405. Successive adaptive approximations with semi-regular connectivity are calculated at 410. These semi-regular approximations are subsequently wavelet transformed at 415 and progressively compressed using zerotrees at 420. The coarsest level connectivity is encoded using a standard non-progressive mesh encoder. The decoder may produce intermediate approximations from any prefix of the bitstream.

Error is based on the distance $d(X,Y)$ between two surfaces X and Y. Let $d(x,Y)$ be the Euclidean distance from a point x on X to the closest point on Y. Then the $L^2$ distance $d(X,Y)$ is given by $$d(X, Y) = \left( \frac{1}{\text{area}(X)} \int_{\infty \in X} d(x_1 Y)^2 \right)^{1/2}$$

This distance is not in general symmetric but can be symmetrized by taking the max of $d(X,Y)$ and $d(Y,X)$. For triangulations this distance can be computed using the publicly available METRO tool described in Cignoni, P., Rocchini, C., and Scopigno, R. Metro: Measuring Error on Simplified Surfaces. Computer Graphics Forum 17, 2 (1998), 167–174. The $L^2$ errors reported here are relative with respect to the bounding box diagonal on a scale of $10^{-4}$, while rate is reported in bits per vertex (b/v) with respect to the number of vertices in the original input mesh. Other error measures could of course be used.

410 represents computation of a smooth parameterization of the input triangulation using the MAPS described in Lee, et al., A. W. F., Sweldens, W., Schroder, P., Cowsar, L., and Dobkin, D. MAPS: Multiresolution Adaptive Parameterization of Surfaces, Proceedings of SIGGRAPH 98 (1998), 95–104. MAPS allows for automatic alignment of isoparameter lines of the semi-regular mesh with sharp features of the original input surface. This can avoid large wavelet coefficients near any creases.

MAPS builds a bijective map between the input mesh T and a coarse base domain B. Regular triangle quadrisection is applied in the base domain B for additional detail. The mapping is used to build semi-regular approximations of T. These approximations have some remeshing error Er with respect to T. While this error can be made arbitrarily small, the remeshing error Er maybe of the same size as the discretization error Ed. This roughly occurs when the triangles from the semi-regular mesh are about the same size as the triangles of the input mesh. Using smaller triangles only serves to produce a better approximation of the input mesh, not necessarily of the original unknown geometry.

An order estimate of Ed may be computed to determine when to complete the operation. The distance between the input mesh T and a much finer mesh S obtained by Butterfly subdividing T may be used for this purpose. The latter serves as a proxy for the unknown original geometry. Once the semi-regular mesh error Er is below the estimated discretization error Ed, there is no need to further refine the semi-regular mesh. Hence the rate distortion curves may converge to the Ed estimate.

The wavelet transform of 415 replaces the original mesh with a coarsest mesh and a sequence of wavelet coefficients expressing the difference between successive more detailed levels. Neighboring vertices of these piecewise smooth models, can be highly correlated. The wavelet transform removes a large amount of this correlation. The distribution of wavelet coefficients is centered around zero. Their magnitude decays at finer levels with the rate of decay related to the smoothness of the original surface. A zerotree coder may be used for the bit encoding of coefficients.

Several methods for building wavelet transforms on semi-regular meshes exist as described in Lounsbery, M., DeRose, T. D., and Warren, J. Multiresolution Analysis for Surfaces of Arbitrary Topological Type. ACM Transactions on Graphics 16, 1 (1997), 34–73. Originally available as TR-93-10-05, October, 1993, Department of Computer Science and Engineering, University of Washington; and Schroder, P., and Sweldens, W. Spherical Wavelets: Efficiently Representing Functions on the Sphere. Proceedings of SIGGRAPH 95 (1995), 161–172. These are typically based on interpolating subdivision schemes such as the Butterfly scheme. Lifted Butterfly wavelets are known. The advantage of lifted wavelets is that both forward and inverse transform can be computed with finite filters. A Loop wavelet transform has the advantage that the inverse transform uses Loop subdivision. Experimentally, we found it has rate distortion curves similar to Butterfly, but typically better visual appearance.

The choice of Loop subdivision fixes the low pass reconstruction filter P in a wavelet construction with a high pass reconstruction filter Q. Together they define the inverse wavelet transform $$p^{j+1} = (PQ)\begin{bmatrix} p^j \\ d^j \end{bmatrix}$$

where $p^j$ are the usual control points and $d^j$ the wavelet coefficients at level j. For performance reasons, Q should have small support. One way to achieve this is to apply the quadrature mirror construction to derive a high pass filter from a low pass filter. The result is shown in the regular case in FIG. 4.

Around irregular vertices, P is modified as usual. For edges immediately adjacent to an "irregular" vertex, that is, one where the valence is other than six, Q is modified as well. The only taps of the Q filter that can fall onto irregular vertices are the two −6 coefficients left and right from the center. If one of them is irregular, that part of the filter is relaxed and the coefficients are parameterized by edge number, counting from the "10". (See the right of FIG. 4) Note that if an irregular vertex has valence less than six, this leads to the stencil folding over on itself. If the valence is larger than six, a gap remains. This does not impact the numerically computed condition numbers of the transform.

The forward wavelet transform, which goes from finer to coarser levels, is defined as the solution $[p^j,d^j]$ of the linear system in Equation 1 for a given $p^{j+1}$. The forward wavelet transform is computed as the solution of a sparse linear system. A bi-conjugate gradient solver with diagonal pre-conditioning may be used.

Solving a linear system may make the forward transform slower than the inverse transform. This is acceptable as encoding is typically done once off-line as compared with decoding which happens frequently and in real time. For the Venus head model, the Loop forward transform takes 30 sec. on a 650 Mhz Pentium III while the inverse transform takes 5 sec. In case symmetry is important, one can use the Butterfly transforms for which both forward and inverse transforms can be performed in 2.5 sec.

Figure 5A:
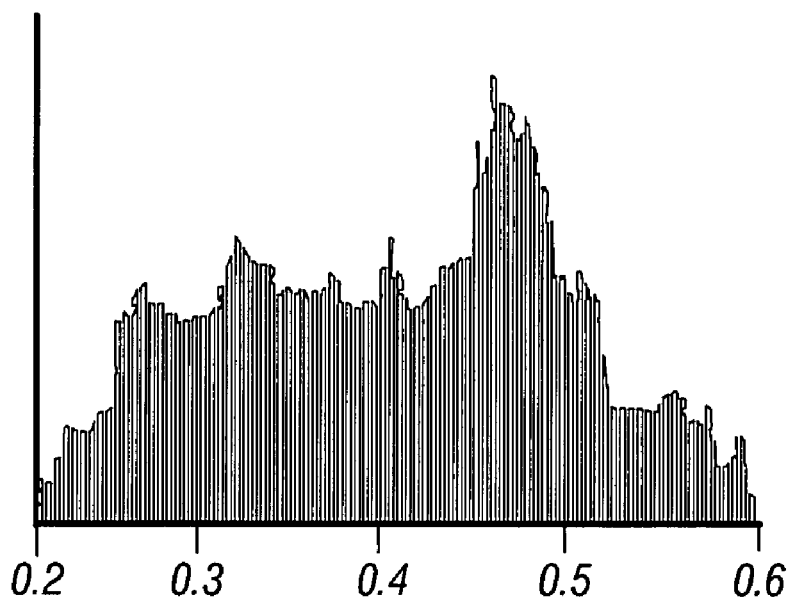
FIG. 5 show histograms of wavelet coefficients.
Figure 5B:
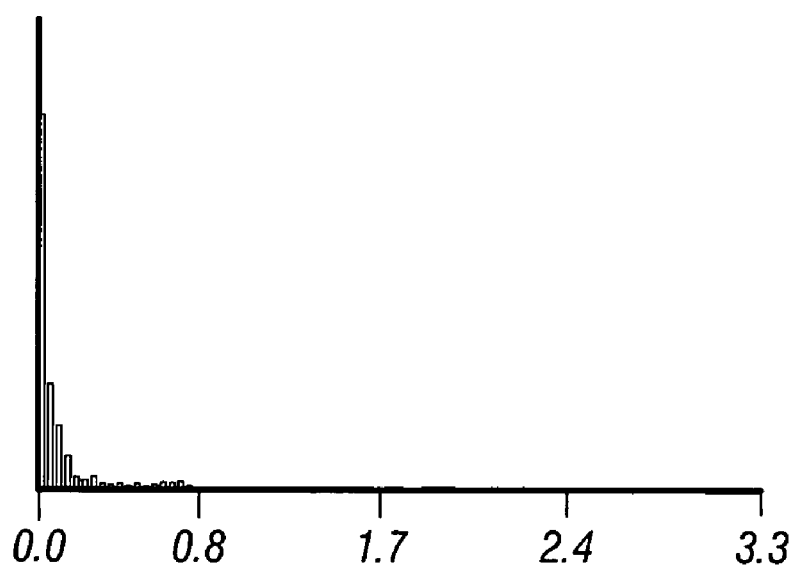

The decorrelating power of the wavelet transform is illustrated in FIG. 5. The left shows the histogram of the magnitude of the Venus model vertex positions. The right shows a histogram of the magnitude of the wavelet coefficients. This demonstrates that a large amount of correlation is removed and the first order entropy is decreased considerably.

Figure 6A:
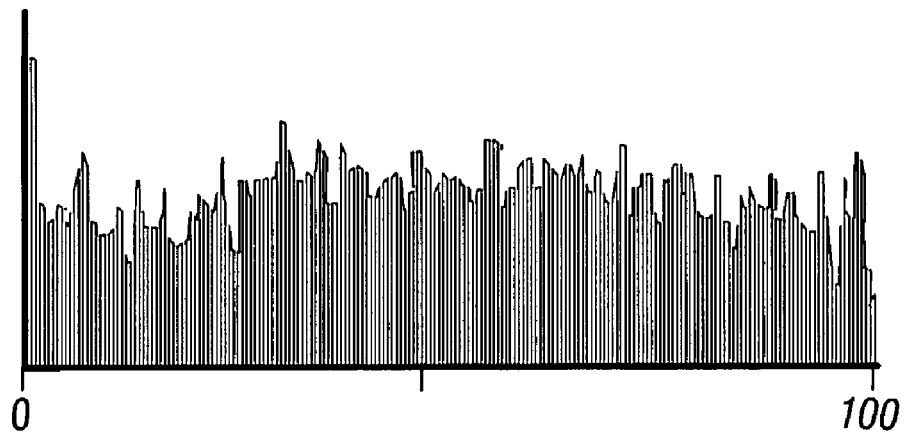
FIG. 6 shows histograms of polar angles of wavelet coefficients.
Figure 6B:
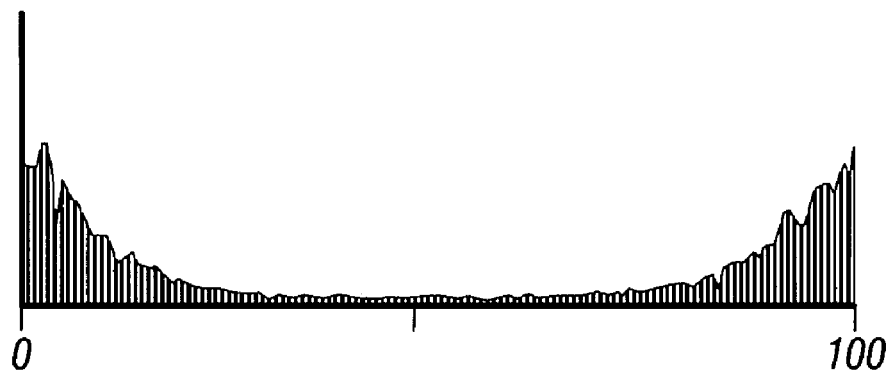

The wavelet transform results in wavelet coefficients which may be vector valued. These coefficients may be represented in a local frame induced by the surface tangent plane. This causes the variance of normal wavelet components to be on average twice as large as the variance of the tangential components. Recalling the earlier geometry versus parameter distinction, this is exactly what we want. In a smooth semi-regular mesh, the geometry information (normal component) is much larger than the parameter information (tangential component). FIG. 6 illustrates this by showing the histograms of the polar angles q (the angle from the z of normal axis) of the wavelet coefficients in global and local coordinate frames. The distribution becomes relatively non-uniform in the local frame with peaks around 0 and $\pi$ indicating that most of the wavelet vectors lie in the normal direction. The f angle is the angle along the equator. This is fairly uniformly distributed and does not change much in the local frame. Consequently any two basis vectors may be used in the tangent plane.

As demonstrated above, parameter, i.e., tangential, information does not contribute to the error metric. The tangential wavelet components can still contain some geometric information. However, the error metric is less sensitive to quantization error of tangential versus normal wavelet components. Thus, the error curves can be improved by more coarsely quantizing the tangential component.

A basic operation in a scalar zerotree coder is the coefficient significance test, i.e., checking its magnitude against a threshold. If it is below the threshold, the coefficient is added to a zerotree, else the location and sign of the coefficient needs to be transmitted. For the vector case, this becomes more difficult. Three quantization options are contemplated. (1) Spherical cells allow the magnitude to be used for the significance test. The quantized angular components become "generalized" signs. (2) For cubical cells, the cube is divided into 64 subcubes. Coefficients in the 8 internal cubes become insignificant and the others become significant. The cell number again is an analog of angular component. (3) Each vector component can be handled independently and encoded separately. This reduces the vector case to three independent scalar passes.

It is believed that three scalar passes results in the best rate distortion curves for all models. Experimentally, it was found that quantization cells for the tangential component were best taken to be 4 times larger than those for the normal component.

Scalar quantization uses, three independent zerotree coders. The bits from the three coders can be interleaved to maintain progressivity.

A general principle of wavelet coefficient encoding is to send the highest order bits of the largest magnitude coefficients first, since they make the most significant contributions towards reducing error. Let $T_0=\max\{|c_i|\}$ be the maximum magnitude of all coefficients. Then, in a first pass the coder should send the locations (index i) of newly significant coefficients, $|c_i|>T_0/2$. Doing so naïvely is expensive. However, if source and receiver agree on a canonical traversal order, the source only has to send the result of the significance test $S(i)=(|c_i|>T)$ and, if true, the sign bit of $c_i$. If coefficients can be organized into canonical sets such that with high probability all coefficients in a given set are simultaneously below threshold, a few set-based significance tests can enumerate the locations of the relevant coefficients. The decay properties of wavelet coefficients make their hierarchical tree organization the natural set structure. Coding consists of a number of passes with exponentially decreasing thresholds $T_{j+1}=T_j/2$. In each pass, significance bits are sent for newly significant coefficients. Additionally, refinement bits are sent for those coefficients which became significant in an earlier pass. Since source and receiver already agreed on locations of the latter, no location bits have to be sent for them. The number of such bit plane passes depends on the final quantization level. The decoder can reconstruct the geometry associated with any prefix of the bitstream by running an inverse wavelet transform on the coefficient bits it has seen so far.

The present system may use a different construction of the zerotrees. For images, one associates the coefficients with a quadrilateral face (pixel) and the trees follow immediately from the face (pixel) quadtree. While this works also for dual, i.e., face based subdivision schemes, our triangular transform is primal, i.e, vertex based.

Figure 7:
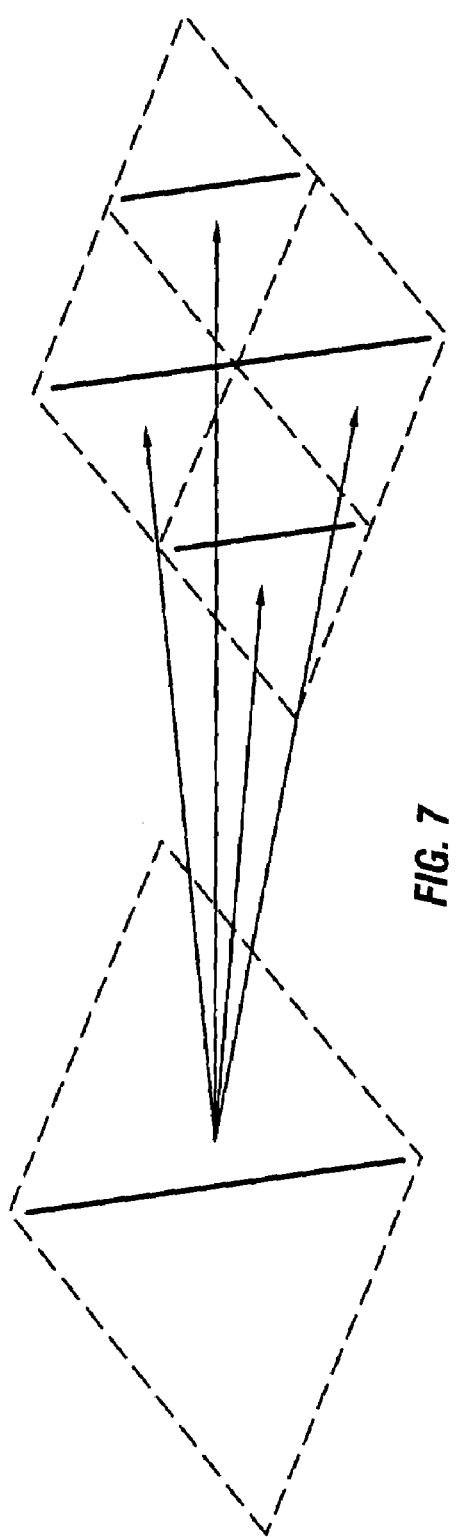
FIG. 7 shows subdivisions of surfaces.

Scale coefficients are associated with vertices. However, wavelet coefficients may be put into a one to one association with edges of the coarser mesh. Each edge can then be the parent of four edges of the same orientation in the finer mesh as indicated in FIG. 7. Hence, each edge of the base domain forms the root of a zerotree; it groups all the wavelet coefficients of a fixed wavelet subband from its two incident base domain triangles. The grouping is consistent even for a semi-regular mesh.

Scale coefficients from the coarsest level are quantized uniformly. Experimentally, it is believed that it may be best to send 4 bit planes initially with the base domain connectivity. Each remaining bitplane is sent as the zerotrees descends another bit plane.

The zerotree technique may be effective at exploiting parent-child coefficient correlations, minimizing the amount of encoded significance bits. However, the output of the zerotree coder can still be compressed further through techniques such as arithmetic coding, which may allow for a fractional number of bits per symbol.

The zerotree coder output has three different types of information, including significance bits, refinement bits and sign bits. Refinement and sign bits tend to be uniformly distributed; hence they are not entropy coded. Significance bits on the other hand can be further entropy coded. For early bitplanes, coefficients may be insignificant resulting in mostly zero bits. For later bitplanes, many coefficients become significant, resulting in mostly one bits. An arithmetic coder naturally takes advantage of this.

Encoding of the significance bits in groups may further improve performance of entropy coding. Children of any node appear together during a zerotree pass. Their significance bits may be grouped to form symbols of a $2^j$ alphabet (j=4,3,2,1). The actual number of bits of the alphabet is the number of children which were left insignificant at the previous pass. This grouping exploits correlations between magnitudes of spatially close wavelet coefficients.

Other embodiments are contemplated. For example, although coding with zerotrees is described, other types of coding may be used.

All such modifications are intended to be encompassed within the following claims.

What is claimed is:

1. A method of compression of a surface, comprising:
   obtaining an input representation of the surface;
   forming a semi-regular mesh representing a geometry of the surface where at least one vertex of the semi-regular mesh is moved to a different location than in the input representation; and
   forming a compressed version of the semi-regular mesh.

2. A method as in claim 1, wherein said forming a semi-regular mesh comprises sliding at least one vertex within the surface, to a location where better compression can be obtained.

3. A method as claim 1, wherein said forming a semi-regular mesh comprises changing a location of samples.

4. A method as in claim 1, wherein said compression comprises changing connectivity between vertices.

5. A method as in claim 1, wherein said forming the compressed version comprises carrying out a wavelet transform to replace the semi-regular mesh with a coarser mesh and a sequence of wavelet coefficients.

6. A method as in claim 5, wherein said wavelet coefficients define a difference between the coarser mesh and the more detailed semi-regular mesh.

7. A method as in claim 1, wherein said forming a semi-regular mesh and said forming a compressed version further comprise forming a coarsest mesh, and carrying out a transform which removes correlation between vertices of remaining portions of the mesh.

8. A method as in claim 7, wherein said transform includes a Loop based wavelet transform.

9. A method as in claim 7, wherein said transform is one used for high order decorrelation and subdivision based reconstruction.

10. A method, comprising:
    obtaining information on a three dimensional part, including parameter information that is described by displacements in the tangent plane to the surface and geometry information that is described by displacements normal to the surface; and
    compressing said information by allocating bits preferentially to displacements in the local normal direction.

11. A method as in claim 10 wherein said compressing comprises first forming a mesh of parameter information that is more regular than an original.

12. A method as in claim 11, wherein said compressing comprises uneven scaling of tangential and normal components.

13. A method as in claim 11, wherein said more regular meshes have substantially only normal prediction residuals.

14. A method as in claim 11 wherein said compressing comprises subsequent hierarchical transformation of such meshes through a hierarchical transform.

15. A method as in claim 14, wherein said transform is based on subdivision methods.

16. A method as in claim 14, wherein said transform includes a wavelet transform.

17. A method as in claim 15, wherein said transform is a wavelet transform whose coefficients are encoded with a zero tree style coder.

18. A method of compression of a surface, comprising:
    obtaining an input representation of the surface;
    forming a semi-regular mesh representing a geometry of the surface where at least one vertex of the semi-regular mesh is in a different location then a vertex of the input representation, the semi-regular mesh formed by sliding at least one vertex within a surface to a location where better compression can be obtained; and
    forming a compressed version of the semi-regular mesh.

19. A method as claim 18, wherein said forming a semi-regular mesh comprises changing a location of samples.

20. A method as in claim 18, wherein said compression comprises changing connectivity between vertices.

21. A method as in claim 18, wherein said forming a compressed version comprises carrying out a wavelet transform to replace the semi-regular mesh with a coarser mesh and a sequence of wavelet coefficients.

22. A method as in claim 21, wherein said wavelet coefficients define a difference between the coarser mesh and the more detailed semi-regular mesh.

23. A method as in claim 18, wherein said forming a semi-regular mesh and said forming a compressed version further comprise forming a coarsest mesh, and carrying out a transform which removes correlation between vertices of remaining portions of the mesh.

24. A method as in claim 23, wherein said transform includes a Loop based wavelet transform.

25. A method as in claim 23, wherein said transform is one used for high order decorrelation and subdivision based reconstruction.

* * * * *